United States Patent
Egan-Walter

(10) Patent No.: US 6,836,924 B2
(45) Date of Patent: Jan. 4, 2005

(54) WIPER BLADE FOR CLEANING GLASS SURFACES ON VEHICLES, ESPECIALLY MOTOR VEHICLES

(75) Inventor: Bruno Egan-Walter, Heilbronn (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 313 days.

(21) Appl. No.: 10/030,896

(22) PCT Filed: Dec. 15, 2000

(86) PCT No.: PCT/EP00/12768
§ 371 (c)(1),
(2), (4) Date: Mar. 4, 2002

(87) PCT Pub. No.: WO01/51323
PCT Pub. Date: Jul. 19, 2001

(65) Prior Publication Data
US 2003/0019066 A1 Jan. 30, 2003

(30) Foreign Application Priority Data
Jan. 7, 2000 (DE) .......................... 100 00 381

(51) Int. Cl.⁷ ............................... B60S 1/38; B60S 1/46
(52) U.S. Cl. .............................. 15/250.04; 15/250.201; 15/250.43; 15/250.48
(58) Field of Search ....................... 15/250.201, 250.04, 15/250.43, 250.44, 250.451, 250.452, 250.453, 250.454, 250.48, 250.361

(56) References Cited

U.S. PATENT DOCUMENTS

| | | | |
|---|---|---|---|
| 3,088,155 A | | 5/1963 | Smithers ................ 15/250.201 |
| 3,116,507 A | * | 1/1964 | Scinta .................... 15/250.451 |
| 3,372,422 A | * | 3/1968 | Anderson .............. 15/250.453 |

FOREIGN PATENT DOCUMENTS

| | | |
|---|---|---|
| DE | 197 29 864 | 1/1999 |
| FR | 2661146 | * 10/1991 |
| FR | 2 679 185 | 1/1993 |
| FR | 2 725 676 | 4/1996 |
| FR | 2 747 977 | 10/1997 |
| GB | 1 447 724 | 8/1976 |

* cited by examiner

Primary Examiner—Gary K. Graham
(74) Attorney, Agent, or Firm—J. Gordon Lewis

(57) ABSTRACT

In the case of a wiper blade for cleaning glass surfaces on vehicles, and having an elongated wiper blade body which consists of a flexible rubber material and can be placed against the glass and is furnished on both its longitudinal sides with longitudinal grooves situated opposite to each other, in which a support or spring spline extending in the longitudinal direction of the wiper strip engages with part of its width, a profiled cover is mounted on and attached to the part of at least one support spline projecting beyond the wiper blade body covering this support spline.

20 Claims, 3 Drawing Sheets

WIPER BLADE FOR CLEANING GLASS SURFACES ON VEHICLES, ESPECIALLY MOTOR VEHICLES

BACKGROUND

The invention relates to a wiper blade for cleaning glass surfaces.

Wiper blades for cleaning glass surfaces on vehicles are known in highly varied configurations. Among them the so-called flat wiper blades are particularly known; they consist basically of a wiper blade body manufactured from a flexible rubber material and of support splines or spring splines engaging in lateral longitudinal grooves in the wiper blade body, which are then attached at both ends of the wiper blade body along with it to the wiper blade by means of end caps, see DE-A-197 39 256.

It is also known in the case of windshield wipers for the wiper blade body to be configured as an airfoil on its upper side facing away from the lip and thus from the glass surface to be cleaned, that is to say, with an inclined surface whose plane in the particular application includes an angle smaller than 90° with the plane of the glass surface, or with a correspondingly concave curved incline, see DE-A-197 34 843.

It is additionally known for wiper blades to provide a distribution passage inside the wiper blade body extending in the longitudinal direction of the wiper blade for a cleaning or washing fluid, where discharge openings are provided at the end caps at both ends of the wiper blade to discharge the cleaning or washing fluid onto the glass surface.

One of the disadvantages of the known wiper blades of the type mentioned above is that the protruding areas or parts of the spring or carrier splines form relatively sharp edges, with a substantial risk of injury. Furthermore, these protruding parts have an especially negative aerodynamic effect on the behavior of the wiper blade and consequently of the windshield wiper at high speeds.

The object of the invention is to demonstrate a wiper blade which avoids these disadvantages.

SUMMARY

The part of the width of the carrier spline or spring spline protruding from the wiper blade body is covered by the profiled cover or molding, respectively, so that the risk of injury no longer exists. The profiled cover can be given an aerodynamically optimal form, especially on its exposed surfaces, so that even at high speed the result is optimal characteristics for the wiper blade furnished with at least one profiled cover.

In the case of the invention, a profiled cover of this type is provided at least on the forward side of the wiper blade facing the direction of travel. The profiled cover can be manufactured in especially advantageous fashion from plastic, for example, and also from softer or flexible plastic, in particular, for example, as an extruded profile which is then cut to the required length in each case.

In the case of one aspect of the invention, the front profiled cover, with respect to the direction of travel in this particular application, is configured as an airfoil on at least one partial surface, which also contributes to an improvement in the behavior of the wiper blade at high speeds.

Furthermore the potential exists of providing in at least one profiled cover at least one distribution passage with at least one discharge opening or nozzle orifice for a cleaning or washing fluid.

BRIEF DESCRIPTION OF THE DRAWING

The invention is explained below in greater detail from embodiments using the drawing in which.

DETAILED DESCRIPTION

Figure 1:
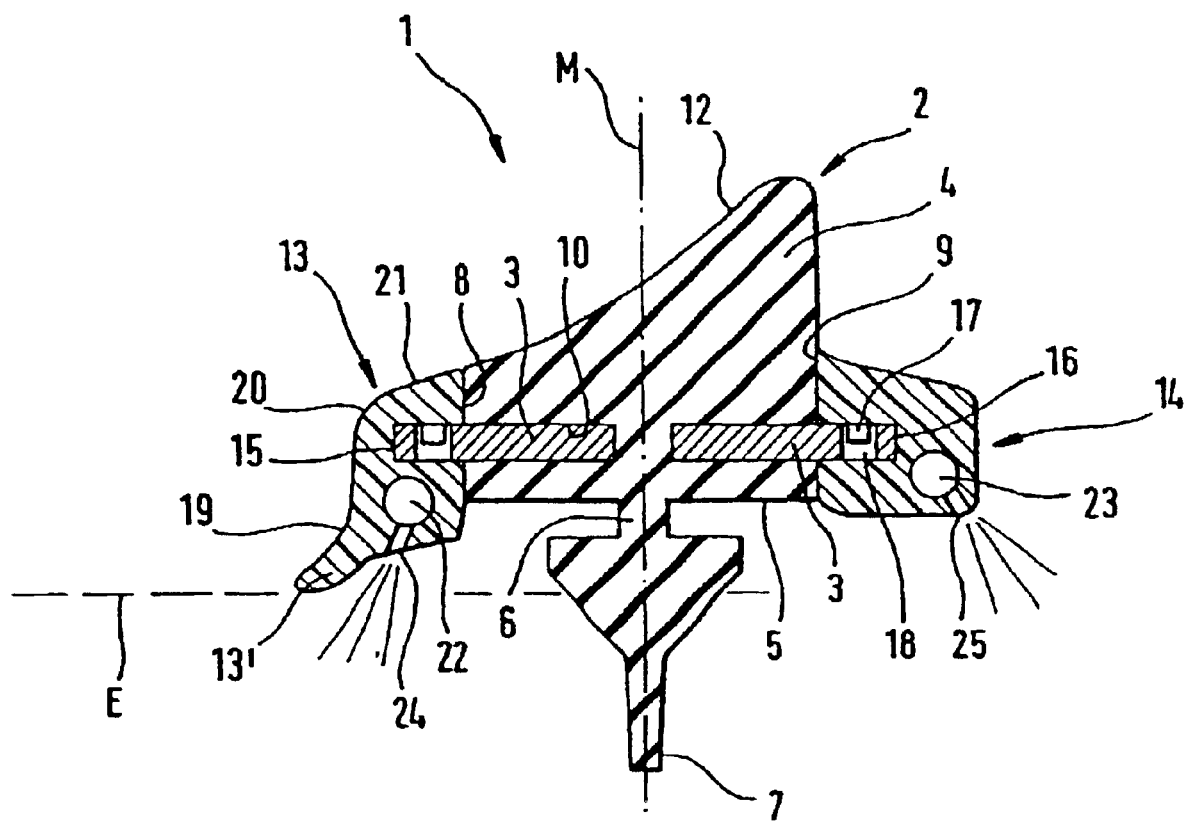
FIG. 1 shows in a simplified rendering a cross section through a wiper blade of a windshield wiper which is otherwise not shown.
Figure 2:
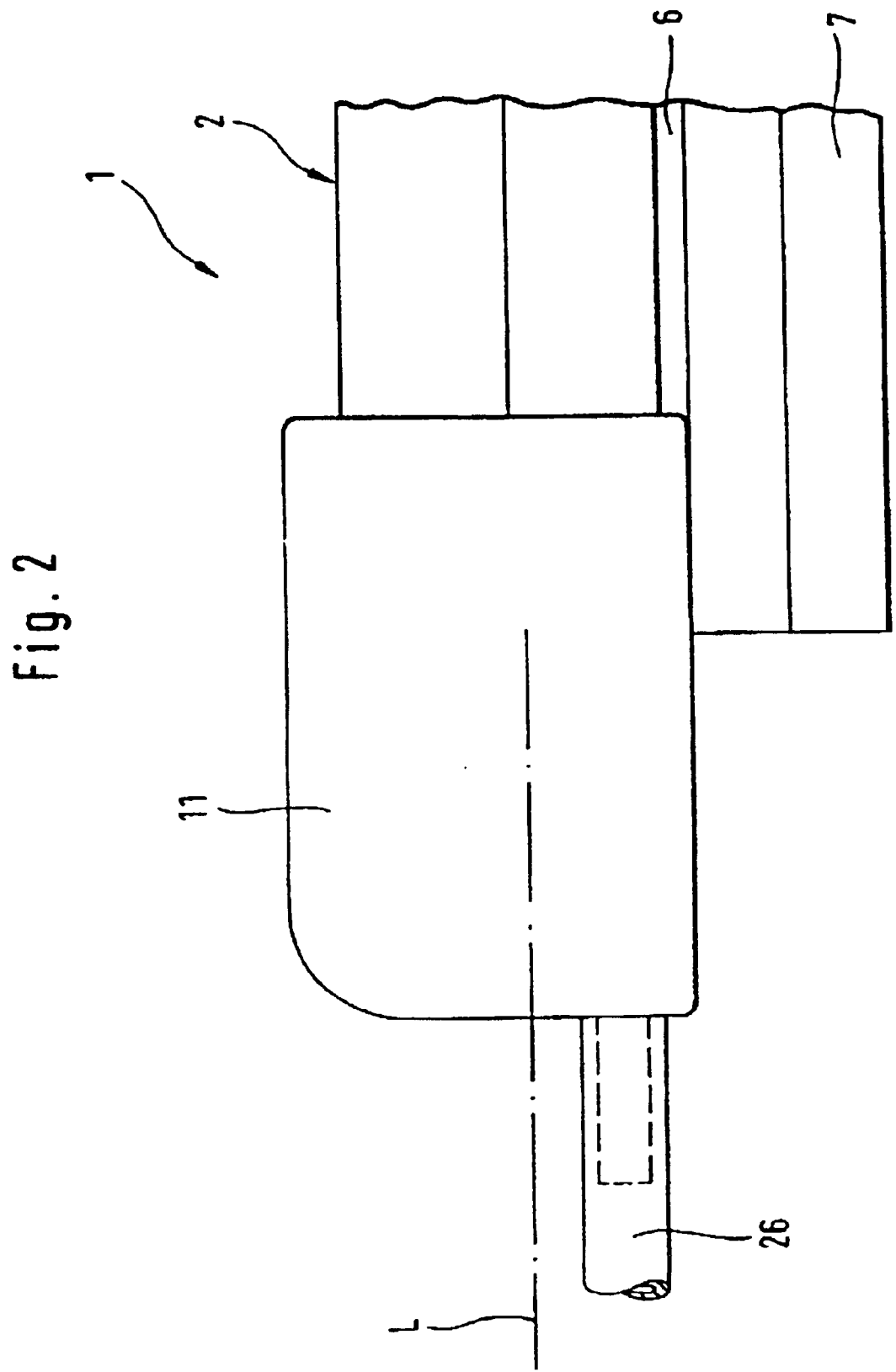
FIG. 2 shows a partial side elevational view of the windshield wiper.

The wiper blade 1 shown in FIGS. 1 and 2 consists of a basically familiar wiper blade body 2 which is manufactured as an airfoil from a flexible rubber material, and from two ribbon-shaped support or spring splines 3 holding the wiper blade body 2 therebetween, which are manufactured from a flexible material, preferably from spring steel and which, like the wiper blade body 2, extend along the entire length of the wiper blade 1, which in FIG. 1 runs perpendicular to the drawing plane.

The cross-section of the wiper blade body 2 forms a section profile 4 with an underside 5 furnished by means of a flexible hinge 6 with the similarly formed-on lip 7, with which in the particular application the wiper blade 1 lies against the vehicle glass surface to be cleaned. A flexible hinge 6 and a lip 7 similarly extend along the entire length of the wiper blade body 2. In the embodiment shown the flexible hinge 6 is formed approximately in the middle of the underside 5, specifically in center plane M which includes the longitudinal axis L of the wiper blade 1. The section profile 4 is furnished with a longitudinal groove on two longitudinal sides 8 and 9 which lie in planes perpendicular to the underside 5 in the embodiment shown. The grooves are open on the longitudinal sides 8 and 9 as well as on the two ends of the wiper blade body 2 and lie in a common plane parallel to the underside 5.

A spring spline 3 is located in each longitudinal groove 10 with one part of its width, with the other part of its width, that is, in the case of the aspect shown about one half of its width, protrudes out of the longitudinal groove 10 above the respective longitudinal side, 8 or 9. In the middle of the wiper blade 1, the wiper blade body 2 is attached to the wiper arm of the windshield wiper, which is not shown, by means of an adapter, that is likewise not shown, which also grips the spring splines 3. Further, end caps 11 are attached at both ends of the wiper blade, which connect the ends of the spring splines 3 to each other as well as to the wiper blade body 2.

As FIG. 1 also shows, the section profile 4 on the upper side of the wiper blade facing away from the lip 7 is configured as an airfoil, that is, one longitudinal side 9 is of a greater height than the other longitudinal side 8, the result being a sloping airfoil surface on the upper side of the wiper blade body 2 forming a concave curve around axes parallel to the longitudinal extent or longitudinal axis L of the wiper blade body 2.

On the protruding sections of the support or spring spline 3 projecting above the longitudinal sides 8 and 9, profiled covers 13, 14 respectively are mounted, which in the aspect shown cover these projecting areas of the support splines 3 over their entire length, that is, right up to the two end caps 11. The profiled covers 13 and 14, which are preferably manufactured from plastic, wrap around the protruding areas of the carrier or spring splines 3 like claws, so that these areas are completely covered. For this purpose, the profiled covers 13 and 14 each have a longitudinal groove 15, 16, respectively, that is open to one longitudinal side of the respective profiled cover 13 or 14 as well as at the two ends of the airfoil, and in which is located the respective protruding part of the spring spline 3.

In the longitudinal grooves 15 and 16 respectively, catches are provided which in the embodiment shown are formed by projections 17, which act in conjunction with mating notches on the support or spring spline 3. In the aspect shown, these mating notches are formed by openings 18, which the support or spring splines 3 have at least on the partial area protruding beyond the wiper blade body 2. With the projections 17 engaging in the openings 18, the profiled covers 13 and 14 are retained by latching onto the wiper blade 1. In the aspect shown, the profiled cover 13 adjacent to the longitudinal side 8 is shaped in such a way that it forms an additional airfoil on its outside facing away from the wiper blade body 2, with airfoil surface 19 also forming a concave curve around axes running parallel to the longitudinal axis L, where in the cross-sectional drawing of FIG. 1a convex curved surface 20 adjoins the airfoil surface 19 and then changes into airfoil surface 20 by way of another surface 21.

As FIG. 1 also shows, the surface 21 forms an extension of airfoil surface 12, so that on the one hand the airfoil surface 12 is enlarged and, on the other hand, an additional airfoil, or rather an additional airfoil surface 19, is created by the profiled cover 13. The airfoil surface 19 is formed at least partially on a projection 13' of the profiled cover 13, which projection 13' extends beyond the underside 5 of the section profile 4.

In the aspect shown, a passage 22, 23 respectively is provided in each profiled cover 13, 14, which extends in the longitudinal direction of the profiled cover 13, 14, respectively. The passages 22, 23 serve on the one hand to reduce the weight of the particular profiled cover. The passages 22 and 23 serve further specifically to distribute and deposit a cleaning or washing fluid on the vehicle glass to be cleaned. To do this, nozzle orifices 24, 25 respectively are provided on the profiled covers 13 and 14 opening into the particular passage 22, 23 respectively, specifically on the underside of the profiled cover facing the vehicle windshield or the lip 7, respectively, such that the nozzle orifices 24, 25 respectively form an acute angle, that is, an angle smaller than 90°, with the center plane M with their axis, and are located radially or roughly radially to the longitudinal extent of the specific passage 22, 23 respectively. The nozzle orifices 24 are arranged to be covered or protected from the slipstream by the projection 13'. To supply the cleaning agent, an end cap 11 is configured as a connector with an internal passage which connects to the passages 22 and 23 as well to a source for the fluid cleaning agent (water, or preferably water with cleaning and anti-freeze additives) by means of a hose 26. The other end cap 11 is then, for example, configured such that it closes off the two passages 22 and 23 at the appropriate end. As FIG. 2 shows, as a result of the positioning of the passages 22 and 23, the corresponding discharge openings 24 and 25 are located at a relatively great distance from the center plane M and therefore from the lip 7, so the result is that the cleaning or wiper fluid deposited on the windshield has a long time to take effect.

Plastic or also a flexible rubber material, for example, flexible plastic is suitable as material for the profiled covers 13, 14. In the aspect shown, profiled cover 13 is incorporated on the side of the wiper blade 1 which in the particular application forms the front side with reference to the direction of travel of the vehicle.

The cleaning or washing fluid can either be discharged simultaneously through the two passages 22 and 23 and the corresponding discharge openings 24 and 25, or the possibility also exists, with the windshield wipers switched on, of controlling the output depending on the direction of the wiper blade's motion in such a way that the output of cleaning or washing fluid always takes place through passage 22 or 23 respectively, or rather those discharge openings 24 and 25 which are moving ahead of the lip 7 with respect to the motion of the wiper blade 1.

Figure 3:
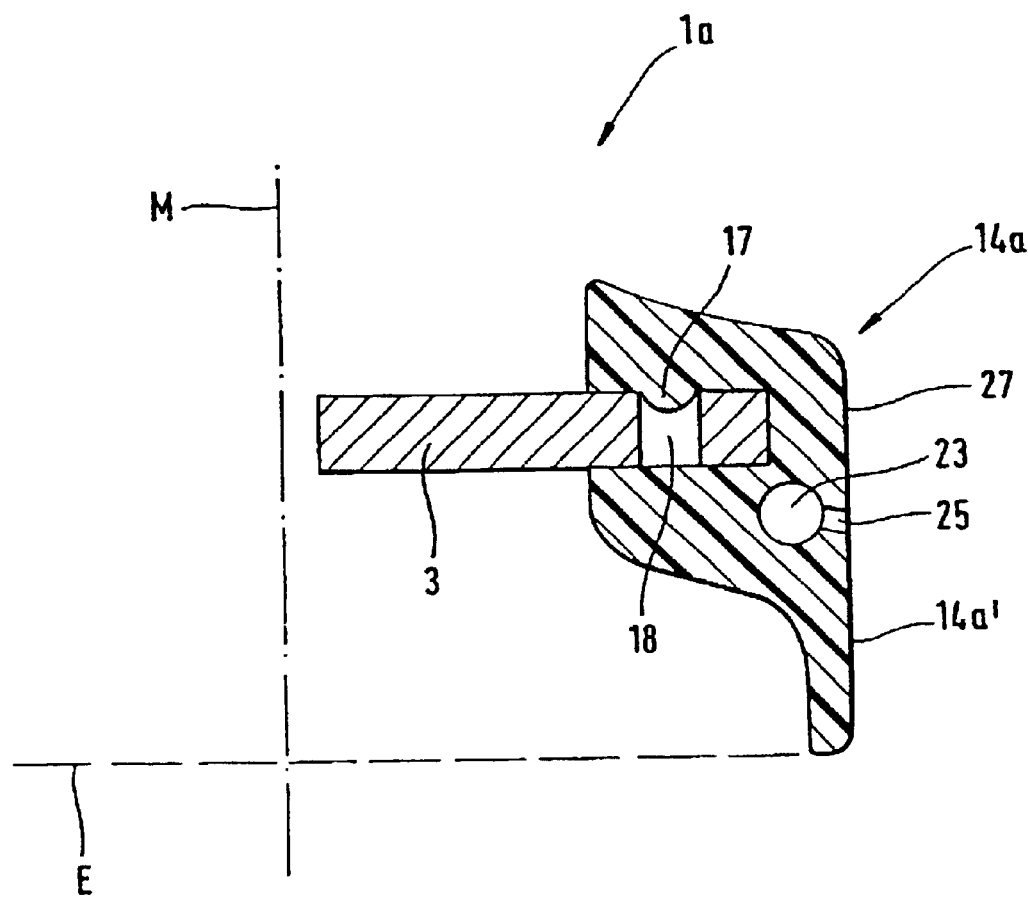
FIG. 3 shows in a simplified partial rendering a cross section through a wiper blade of a further possible aspect of the invention.

FIG. 3 shows as a further possible aspect of the invention, a wiper blade 1a of which for the sake of simpler presentation only the spring spline 3 located on the right of the center plane M is shown together with a profiled cover 14a, which corresponds to the profiled cover 14 of the wiper blade 1, although it has a shape differing somewhat from profiled cover 14. Otherwise the wiper blade 1a is configured in the same way, particularly with respect to the wiper blade body 2, the support spline 3 and the profiled cover 13, as was described previously for the wiper blade 1.

As shown, in the area of its outer side 27, which forms the particular longitudinal side of the wiper blade and faces away from the wiper blade body 2, the profiled cover 14a is furnished with a strip-like face 14a' which in a similar way to the projection 13' of the profiled cover 13 extends with its open edge clearly beyond the underside of the remaining part of the profiled cover 14a facing the lip 7, and specifically, for example, as far as a plane E which is perpendicular to the center plane M, intersects the lip 7 below the flexible hinge 6, and on which or in the vicinity of which, for example, the open edge of the projection 13' is located. In the aspect shown, the outside of the face 14a' away from the lip 7 forms the continuation of the outside 27. The face 14a' extends over the entire length of the profiled cover 14a or over the entire or almost the entire length of the wiper blade 1a. The profiled cover 14a once again has the passage 23 with the nozzle orifices 25, which, however, in this aspect include an angle with the center plane M which is larger, compared with the corresponding angle of the nozzle orifices 25 for wiper blade 1.

As a result of the face 14a, there is a particularly favorable change in the airflow (among other things) such that specifically at the upper reversing point of the motion of the wiper blade, that is, in the vicinity of a vehicle's A-pillar during the inwipe stroke, or the downward motion, in which the longitudinal side of the wiper blade 1a with the face 14a' is trailing, the water which was wiped off the vehicle windshield by the wiper blade during its upward motion, is prevented from running after the wiper blade 1a and thereby impairing vision.

What is claimed is:

1. A wiper blade for cleaning glass surfaces on vehicles, specifically motor vehicles, having an elongated wiper blade body which consists of a flexible rubber material and can be laid against the particular glass surface, furnished on both longitudinal sides with longitudinal grooves situated opposite each other, in which a preferably springy support spline extending in the longitudinal direction of the wiper blade body engages with part of its width, where each support spline protrudes beyond the longitudinal side in question with a further part of its width, characterized in that a profiled cover covering this support spline is mounted and attached to the protruding part of at least one of the support splines, wherein an upper side of the wiper blade body has at least one airfoil surface acting as an extension of at least one airfoil surface formed on an upper side of the profiled cover.

2. The wiper blade in accordance with claim 1, wherein at least one profiled cover is provided on a front side of the wiper blade with respect to the direction of travel of a vehicle.

3. The wiper blade in accordance with claim 1, wherein a profiled cover is mounted on the projecting parts of both support splines.

4. The wiper blade in accordance with claim 1, wherein the profiled cover covers projecting parts of each of the support splines along an entire length.

5. The wiper blade in accordance with claim 1, wherein at least one profiled cover fits closely against an adjacent longitudinal side of the wiper blade body.

6. The wiper blade in accordance with claim 1, wherein at least one profiled cover is retained on the appropriate support spline by catches.

7. The wiper blade in accordance with claim 1, wherein the at least one profiled cover has a longitudinal groove with which it is mounted on the protruding part of at least one support spline.

8. The wiper blade in accordance with claim 7, wherein at least one projection is provided in the longitudinal groove of the cover which acts in conjunction with a mating notch on the specific support spline.

9. The wiper blade in accordance with claim 1, wherein at least one passage extending in the longitudinal direction of the wiper blade is provided in at least one profiled cover for a cleaning or washing fluid, and wherein at least one nozzle orifice opens into the passage to discharge the cleaning or washing fluid onto a glass surface.

10. The wiper blade in accordance with claim 9, characterized by at least one connection to connect the passage to a source for cleaning or washing fluid.

11. The wiper blade in accordance with claim 1, wherein at least one profiled cover has one of a strip-like projection and a strip-like face which extends beyond an underside of the remaining part of the profiled cover.

12. The wiper blade in accordance with claim 1, wherein at least one profiled cover is configured as one of an airfoil on an outer surface extending in the longitudinal direction of the wiper blade and with a primary airfoil surface.

13. The wiper blade in accordance with claim 12 wherein the at least one profiled cover includes a front profiled cover on the front side of the wiper blade with respect to the direction of travel of a vehicle.

14. The wiper blade in accordance with claim 1, wherein a projection formed on at least one profiled cover is equipped with a primary airfoil surface.

15. The wiper blade in accordance with claim 1, wherein the wiper blade body is configured on one upper side as at least first and second airfoil surfaces.

16. The wiper blade in accordance with claim 15, wherein at least one profiled cover has a surface which adjoins the second airfoil surface and effectively increases the width of the second airfoil surface.

17. The wiper blade in accordance with claim 1, wherein at least one profiled cover is manufactured from plastic.

18. The wiper blade in accordance with claim 1, wherein at least one profiled cover is manufactured from a flexible material.

19. In a wiper blade for cleaning a glass surface on a motor vehicle having an elongated wiper blade body including a flexible rubber material to be laid against the glass surface, the flexible rubber material furnished on both longitudinal sides with longitudinal grooves situated opposite each other, a springy support spline extending in a longitudinal direction of the wiper blade body and engaging a portion of a width of the support spline with the flexible rubber material, where each support spline includes a protruding part extending beyond a corresponding longitudinal side of the flexible rubber material, the improvement comprising:

at least one profiled cover covering at least one of the support splines, the at least one profiled cover mounted and attached to the protruding part of the at least one support spline, wherein the at least one profiled cover fits closely against an adjacent longitudinal side of the wiper blade body, such that a combination of upper surfaces of the at least one profiled cover and the wiper blade body define at least one continuous airfoil surface contour.

20. The wiper blade of claim 19, the wiper blade body on one upper side includes at least one airfoil surface.

* * * * *